United States Patent
Meynier

(10) Patent No.: US 6,289,985 B1
(45) Date of Patent: Sep. 18, 2001

(54) SYSTEM INTENDED FOR PERMANENT INSTALLATION OF MEASURING SONDES AGAINST THE INNER WALL OF A PIPE

(75) Inventor: Patrick Meynier, Chatou (FR)

(73) Assignee: Institut Francais du Petrole, Rueil-Malmaison (FR)

( * ) Notice: Subject to any disclaimer, the term of this patent is extended or adjusted under 35 U.S.C. 154(b) by 0 days.

(21) Appl. No.: 09/461,393

(22) Filed: Dec. 15, 1999

(30) Foreign Application Priority Data

Dec. 18, 1998 (FR) .................................................. 98 16090

(51) Int. Cl.$^7$ .................................................. E21B 47/01
(52) U.S. Cl. .............................. 166/60; 166/77.1; 175/50
(58) Field of Search ........................... 166/60, 61, 382, 166/117.7, 77.1, 65.1, 66.7, 302; 175/40, 50

(56) References Cited

U.S. PATENT DOCUMENTS

| 3,784,732 | * | 1/1974 | Whitfill, Jr. ........................ 174/108 |
| 4,501,337 | * | 2/1985 | Dickinson, III et al. ............ 175/171 |
| 5,199,497 |   | 4/1993 | Ross . |
| 5,301,213 | * | 4/1994 | Linden et al. ...................... 376/260 |
| 6,062,315 | * | 5/2000 | Reinhardt ........................... 166/381 |

FOREIGN PATENT DOCUMENTS

| 2548727 | 1/1985 | (FR) . |
| 2632010 | 12/1989 | (FR) . |
| 2656034 | 6/1991 | (FR) . |
| 2166185 | 4/1986 | (GB) . |

* cited by examiner

Primary Examiner—Frank S. Tsay
(74) Attorney, Agent, or Firm—Antonelli, Terry, Stout & Kraus, LLP

(57) ABSTRACT

The present invention is a system permanently installing measuring sondes against the inner wall of a pipe (1) such as a well or a tube. Measuring sondes (8) are respectively associated with coupling devices (2) that are brought to their coupling points in the pipe by means of an elongate support element (3) such as a cable or a tube. Each coupling device (2) comprises a deformable element (6) made of a shape-memory alloy that is deformed in order to allow displacement thereof along the pipe, and that is brought back to its expanded (convex) shape for example by means of a hot fluid stream that is injected in the pipe by means of a pump (P). In this expanded position, it immobilizes coupling device (2) and presses the sonde (8) against pipe (1) while mechanically decoupling the sonde from support element (3). The support element may be withdrawn if not serving another purpose.

44 Claims, 2 Drawing Sheets

SYSTEM INTENDED FOR PERMANENT INSTALLATION OF MEASURING SONDES AGAINST THE INNER WALL OF A PIPE

BACKGROUND OF THE INVENTION

1. Field of the Invention

The present invention relates to a system intended for permanently installing measuring sondes against the inner wall of pipes.

2. Description of the Prior Art

It is well-known to lower seismic receivers into a well by means of a support such as a tube lowered in the well to a working depth. The receivers are placed in sondes. mobile boxes or pads secured to anchor systems suited to move on request the receivers until they are coupled with the well wall, directly or by means of a casino pipe. The anchor systems can comprise mobile arms that can be shifted by hydraulic jacks or springs. Displacement to an expanded position is performed by electric or hydraulic triggering means controlled by an operator from the surface, once the depth of installation is reached. They can also be secured to flexible blades such as tube off-centering blades and pressed against the well wall thereby.

U.S. Pat. No. 5,181,565 describes a system for permanent installation, in a well, of a sonde for seismic or acoustic pickups by means of a tubular string such as a production tubing for example. The sonde (or each one of them) is associated with a system externally fastened to the string. At the operator's request, each sonde can be moved from a set back position where it is coupled with the string to a position of coupling with the wall of the well (or a well casing tube) and acoustically decoupled from the string.

SUMMARY OF THE INVENTION

The system according to the invention installs, at an operator's request, at least one measuring sonde (containing seismic receivers for example) against the wall of a pipe such as a well or a tube, at a point thereof where it is brought by displacement of a sufficiently rigid elongate support element (an electrocarrying cable, a rod, a tube, a tubing, etc.). The system comprises at least one device for coupling each sonde, comprising at least one deformable element made at least partly of a shape-memory alloy to which the sonde is fastened, this deformable element being suited to be brought, under the action of a temperature variation, from a set back position at a distance from the wall of the tube or of the well to an expanded position where said sonde is pressed against the wall of this tube or well and acoustically decoupled from the elongate support element, and devices which intermittently heat the shape-memory element.

The installation system according to the invention has applications in many industries and is useful for positioning various measuring sondes useful for long-life monitoring of underground zones, such as hydrocarbon reservoirs during exploration and/or production stages, or storage or burial reservoirs. The system can be used for example for installing seismic pickups (geophones, hydrophones, etc) coupled with the wall of a well for monitoring operations, whether for active monitoring using a seismic source placed at the surface, in another well or in the same well, or passive monitoring for detecting reactions of the zone in response to production operation carried out therein.

It can also be used for anchoring in wells sondes lowered at the end of a cable comprising receivers, notably seismic pickups.

According to a first embodiment, the system comprises means for transverse positions of the support element in the well or tube, the coupling device comprising, a tubular sleeve supporting each deformable element, the cross-section of the tubular sleeve being larger than that of the support element, the deformable element being dimensioned so as to immobilize the tubular sleeve against the support element in the set back position thereof and to decouple the tubular sleeve from the support element in the expanded position thereof, as a result of the deformation of this part through heating.

According to a variant of this embodiment, each device can comprise elastic damping devices placed between the sleeve and the support element, which mechanically decouples each sonde from the support element when each deformable element is in an expanded position.

The deformable elements can be, for example, plates or blades entirely made of a shape-memory material whose opposite ends are secured to the sleeves. These deformable elements can also be partly made of a shape-memory alloy and comprise for example one or more parts (articulated or not) fastened to parts made of a shape-memory material, so dimensioned that the deformable element reaches said expanded position.

According to another embodiment, each device comprises at least one tubular element made of a shape-memory alloy, placed between stops secured to the support element, this tubular element being deformable from a set back position where its cross-section is smaller than the cross-section of the tube or well to an expanded position where its cross-section is at least equal to the cross-section of the tube or well, where it is decoupled from the stops.

According to another embodiment, the support element is a cable, at least one sonde being lowered in the pipe suspended from this cable, this sonde comprising a body, an anchor arm that can be moved away from the body by deformation of at least one element made of a shape-memory alloy, and a heat source which heats the element on request which moves away of each anchor arm and coupling of the body against the wall of the pipe.

According to a first implementation mode, the intermittent heat source comprises a pumping installation which circulates in the pipe (well or tube) a fluid at a sufficient temperature to cause deformation of each deformable element until reaching its expanded position.

According to another implementation mode, the heat source comprises electric resistors included in each deformable element and a power supply circuit connected to a source of current.

According to a variant that can be used when the outer face of the tube is accessible, the system comprises mobile heat source that can be positioned outside the tube, in the neighborhood of each coupling device.

The system can be used for example for installing a series of seismic sondes against the wall of a wellbore drilled through an underground zone, and it comprises in this case a transmitter, to a surface recording station, of signals picked up by the various seismic sondes. The support element used to lower the various coupling devices to their working depth can either be a tubing that remains in place in the well where it is used for carrying fluids (hydrocarbon production, injection of scavenging fluids, gas, substances to be stored, etc.), or a simple tube that is withdrawn once the seismic sondes are coupled with the well wall, or a cable intended for suspension of one or more sondes in a well.

BRIEF DESCRIPTION OF THE DRAWINGS

Other features and advantages of the system according to the invention will be clear from reading the description hereafter of non limitative realisation examples, with reference to the accompanying drawings wherein.

DETAILED DESCRIPTION OF THE PREFERRED EMBODIMENTS

The installation system according to the invention is suited for lowering, in a pipe 1, one or more devices 2 for coupling measuring sondes. In underground applications for example, pipe 1 can be the wall of a wellbore drilled through a formation or possibly a conventional casing pipe cemented in the well. Coupling devices 2 are lowered all along pipe 1, to the coupling points, by means of any sufficiently rigid support element 3: a rod, a tube or a tubing used for transfer of fluids between the surface and the underground zone in one direction or in the opposite direction, according to applications.

Figure 1:
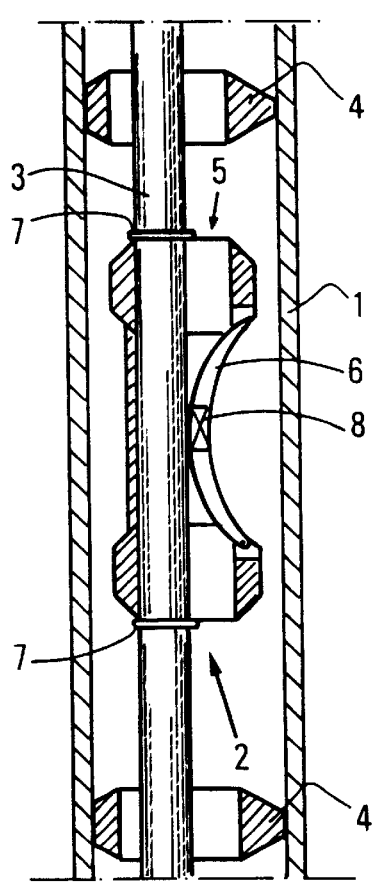
FIGS. 1 and 2 diagrammatically show a coupling device using a shape-memory coupling element, associated with a guide tube, shown in a set back position suited for moving a measuring sonde along a tube (FIG. 1), and in an expanded position suited for coupling the sonde with the tube wall (FIG. 2), FIG. 3 diagrammatically shows a second embodiment of the coupling element in the set back position thereof, FIG. 4 diagrammatically shows the position taken by the coupling element of FIG. 3 in an expanded position.
Figure 2:
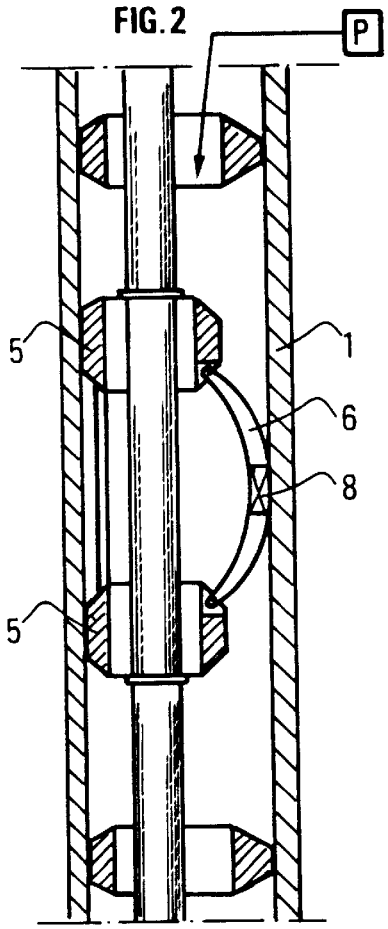

According to the embodiment of FIGS. 1, 2, support element 3, which is here a tube, is associated with off-centering elements 4 arranged on either side of each couplings device 2 and intended to position tube 3 in relation to pipe 1. Each coupling device 2 comprises a tubular sleeve 5 of larger section than tube 3, provided with a deformable element 6.

A deformable element entirely made of a shape-memory alloy of a type known to the man skilled in the art is for example used. Such alloys are described in many documents, notably in "Engineering Journals". Such alloys undergo a thermoelastic martensitic type reversible structural transformation that occurs between a certain temperature at which they are deformed and a higher threshold temperature, variable according to the alloys used, where they regain their initial shape. These alloys are for example based on titanium-nickel or copper-zinc-aluminum combinations. Some properties of Ti—Ni and Cu—Zn—Al alloys are given in the table hereafter as regards their operating or hysteresis temperatures and their deformation power:

|  |  | Ti—Ni | Cu—Zn—Al |
| --- | --- | --- | --- |
| Maximum operating temperature for shape memory | ° C. | 300 | 100 to 120 |
| Martensitic transformation hysteresis | ° C. | 20 to 40 | 5 to 15 |
| Maximum tensile strain recoverable by memory | % | 8 | 4 |

Annular stops 7 are fastened to tube 3 on either side of each sleeve. Their cross-section is smaller than the inner section of sleeve 5. Deformable element 6 is here a plate or a blade resting on sleeve 5 at its opposite ends, whose memorized shape is that shown in FIG. 2.

As the coupling device is introduced into pipe 1, deformable element 6 is deformed towards the inside so as to rest against tube 3. In this position, the sleeve is immobilized longitudinally by annular stops 7.

When the coupling device has reached its prescribed position in the pipe, a local temperature rise above the threshold temperature is produced, so that deformable element 6 regains the convex shape shown in FIG. 2 and, in its central part, it is tightly pressed against the wall of pipe 1. It is this central part resting, against pipe, 1 to which the measuring sonde 8 is fastened.

Off-centering devices 4 are so dimensioned that annular sleeve 5 is substantially centred on tube 3 and stops 7. The measuring sonde is therefore entirely mechanically decoupled from tube 3. This layout is particularly suited for applications where tube 3 is a production tubing that is left in place for fluid transfers and where the sondes include seismic or acoustic type pickups (geophones for example) which would otherwise be sensitive to the vibrations to which the tubing is subjected during operation. For other applications where tube 3 is not necessary any longer, it is possible to withdraw it completely, the coupling devices remaining in place and resting against the inner face of pipe 1.

According to a variant of the previous embodiment, in the absence of off-centering means 4 stabilizing the position of the tube in pipe 1, it is possible to obtain mechanical decoupling of each measuring sonde in relation to tube 3 by interposing elastic damping means (not shown) between the tube and the sleeve.

A pumping installation allowing to inject into the pipe a fluid at the temperature required for coupling blades 6 to expand can be used as heating means for example. The temperature triggering deformable elements 6 can be obtained by including in coupling devices 2 electric resistors supplied, from the outlet of pipe 1 (from a surface installation for example), by an electric generator (not shown).

If pipe 1 is accessible from outside, a heating means of any type allowing to locally raise the temperature at the points where coupling devices 2 are positioned can be used in this case.

Figure 3:
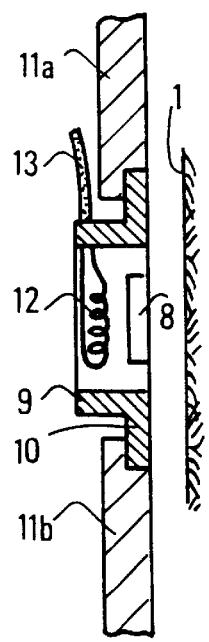
Figure 4:
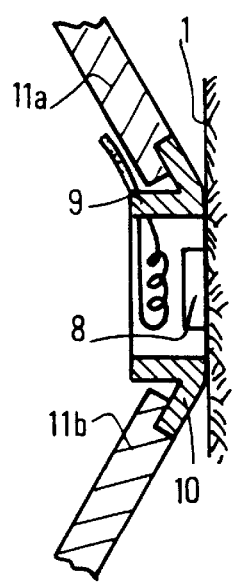

According to the embodiment of FIGS. 3, 4, each deformable element can also consist of several parts. It comprises two corner plates 10A, 10B fastened to a box 9 containing pickups. Two connecting parts 11A, 11B (flexible or not) connect the two corner plates 10 to the ends of sleeve 5. Corner plates 10A, 10B are made of a shape-memory alloy. The memorized shape that provides coupling of sonde 8 with the wall of pipe 1 is that shown in FIG. 4. The constrained shape allowing each coupling device 2 to engage into pipe 1 is shown in FIG. 3. Electric resistors 12 placed in box 9 and connected by a cable 13 to an electric generator (not shown) can be used as heating means for example.

Figure 5:
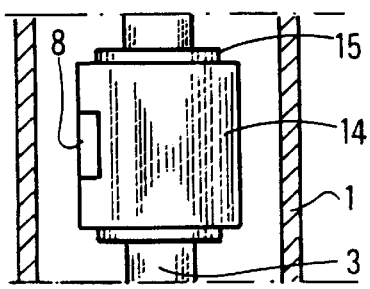
FIGS. 5 and 6 diagrammatically show a third embodiment of each coupling device in the set back position thereof, in a lengthwise (FIG. 5) and cross-sectional view (FIG. 6) respectively, FIGS. 7 and 8 diagrammatically show the same third embodiment of each coupling device in the expanded position thereof, also in a lengthwise (FIG. 7) and cross-sectional view (FIG. 8) respectively, and FIGS. 9 and 10 diagrammatically show another embodiment of the system applied to a sonde lowered in a well at the end of an electrocarrying cable for example, and which is coupled with the wall by moving away an arm made of a shape-memory alloy.
Figure 7:
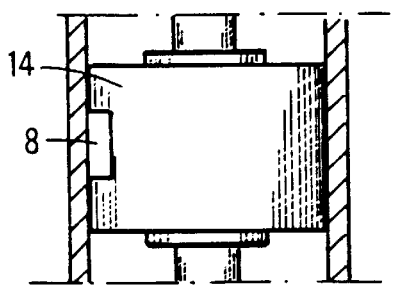
Figure 6:
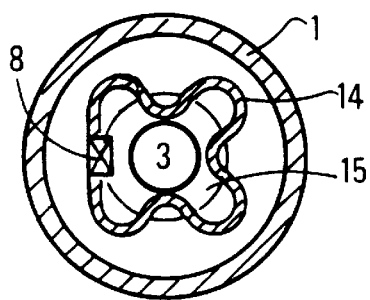
Figure 8:
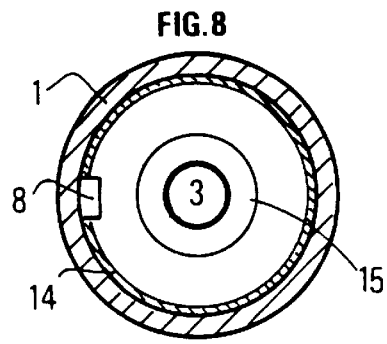

According to the embodiment of FIGS. 6 to 8, each coupling device 2 comprises a deformable tubular element 14 made of a shape-memory alloy that is placed between stops 15 secured to the support element. A measuring sonde 8 is arranged against the outer face of tubular element 14. In its set back position (FIGS. 5, 6) required for transfer of each sonde to its coupling point, its cross-section is smaller than that of pipe 1 and it rests at least partly against end stops 15. In the expanded position, also restored by heating, tubular element 14 is brought back to an extended position where its cross-section is at least equal to the cross-section of pipe 1, and where it is decoupled from stops 15 and tube 3.

This layout can be used to simultaneously obtain sealing of pipe 1, provided that tubular element 14 has a closed terminal wall.

The system that has been described can be used for example to install a series of seismic sondes 8, 9 against the wall of a wellbore 1 drilled through an underground zone, and it comprises in this case means L for transmitting signals picked up by the various seismic sondes to a surface recording station (not shown).

The elongate support element 3 used to lower the various coupling devices to the installation depth can be a tubing that remains in place in the well where it is used to carry fluids (hydrocarbon production, injection of scavenging fluids, gas, substances to be stored, etc.), or a simple tube that is withdrawn once the seismic sondes are coupled with the well wall, as described.

Figure 9:
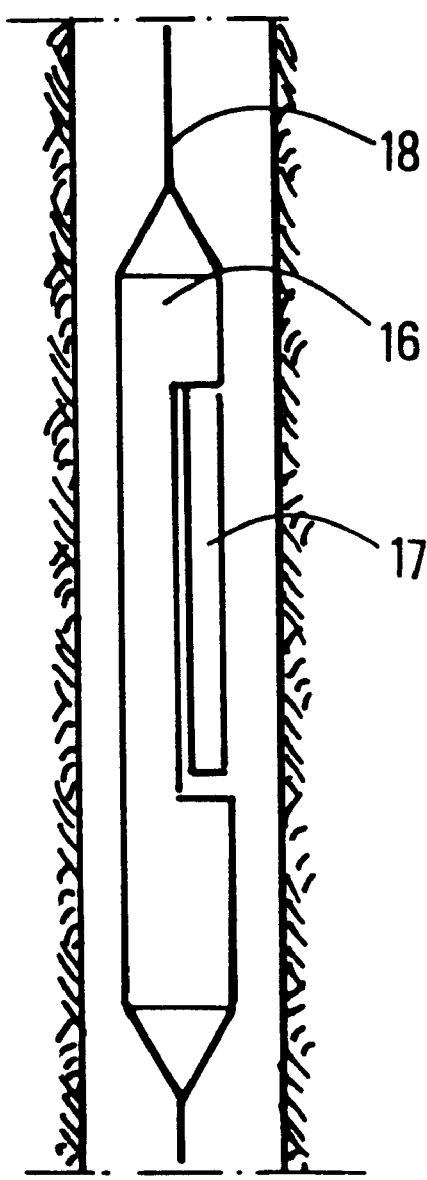
Figure 10:
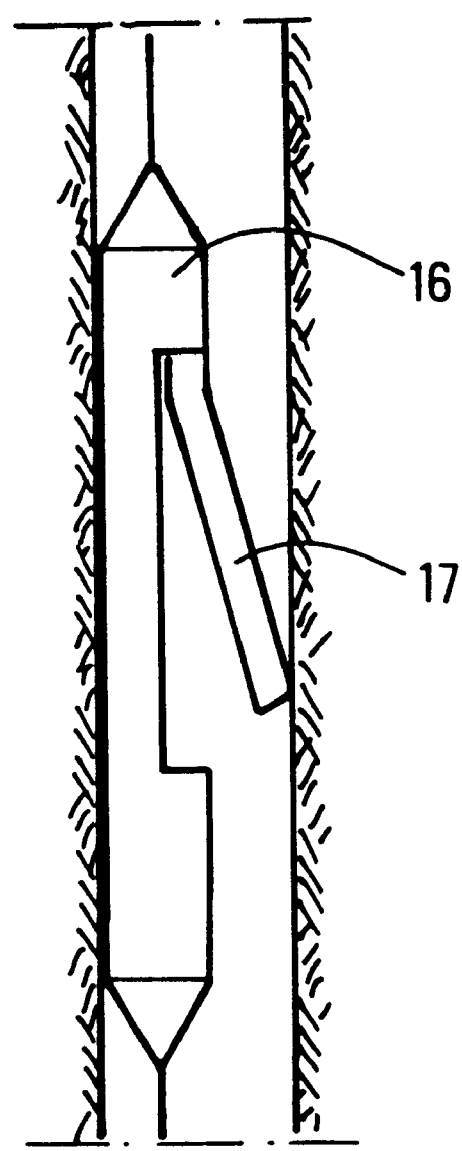

The elongate support element can also be an electrocarrying cable used to lower in a pipe or a well one or more sondes of a type described for example in U.S. Pat. Nos. 4,616,703 and 4,957,162 filed by the assignee. Such a sonde comprises (FIGS. 9, 10) a rigid body 16 that can be pressed against the wall of pipe 1 through opening of an anchor arm 17. This anchor arm can be entirely made of a shape-memory alloy and comprise housings for electric resistors (not shown) that are supplied from the surface by electric conductors in cable 18 supporting the sonde. As in the embodiment already described in connection with FIGS. 3, 4, the arm can be made at least partly of such an alloy, the heating source being located at the place where the deformable part is arranged. According to a variant already described, opening of such an arm can also be obtained by pumping a sufficiently hot fluid into pipe 1.

Embodiments where measuring sondes 8, 9 are coupled with the inner wall of a pipe by means of deformable elements made of a shape-memory alloy have been described. A similar technique could of course be used for coupling sondes with the outer wall of any tube.

What is claimed is:

1. A system used to install at least one measuring sonde against a wall of a pipe, comprising:

a support element, at least one coupling device which couples each sonde to the wall of the pipe having at least one deformable element, each deformable element being at least partially made of a shape-memory alloy, to which each measuring sonde is fastened, the deformable element in response to a temperature variation being moved from a set-back position disposed at a distance from the wall of the pipe to an expanded position where each sonde is pressed against the wall of the pipe and acoustically decoupled from the support element, and a heat source which provides heat to the shape-memory alloy to vary the temperature of the shape-memory element.

2. A system as claimed in claim 1, wherein:

each coupling device comprises a tubular sleeve supporting each deformable element, a cross-section of the tubular sleeve being larger than a cross-section of the support element, each deformable element being dimensioned to immobilize the tubular sleeve in relation to the support element in the set back position and to decouple the tubular sleeve from the support element in the expanded position thereof.

3. A system as claimed in claim 2, comprising:

a centering element which transversely positions the support element in the pipe, the centering element being dimensioned so that in an expanded position of each deformable element, each coupling device is mechanically decoupled from the support element.

4. A system as claimed in claim 3 wherein:

each coupling device comprises an elastic damping device arranged between the tubular sleeve and the support element which mechanically decouples each measuring sonde from the support element in the expanded position of each deformable element.

5. A system as claimed in claim 4, wherein:

each deformable element comprises an assembly including parts made of a shape-memory alloy and dimensioned to cause each deformable element to reach the expanded position as a result of the deformation of the parts by heat from the heat source.

6. A system as claimed in claim 3, wherein:

each deformable element comprises an assembly including parts made of a shape-memory alloy and dimensioned to cause each deformable element to reach the expanded position as a result of the deformation of the parts by heat from the heat source.

7. A system as claimed in claim 3, wherein:

the heat source comprises a pumping installation for circulation in the pipe a heated fluid causing deformation of each deformable element until reaching the expanded position thereof.

8. A system as claimed in claim 3, wherein:

the heat source comprises an electric resistance included in each deformable element and a power supply circuit connected to a source of current at the surface which provides electric current to the electric resistance.

9. A system as claimed in claim 3, wherein:

the heat source comprises a mobile heating device positionable outside the pipe adjacent each coupling device.

10. A system as claimed in claim 2 wherein:

each coupling device comprises an elastic damping device arranged between the tubular sleeve and the support element which mechanically decouples each measuring sonde from the support element in the expanded position of each deformable element.

11. A system as claimed in claim 10 wherein:

each deformable element is entirely made of a shape-memory material having ends secured to the tubular sleeve.

12. A system as claimed in claim 11, wherein:

each deformable element comprises an assembly including parts made of a shape-memory alloy and dimensioned to cause each deformable element to reach the expanded position as a result of the deformation of the parts by heat from the heat source.

13. A system as claimed in claim 10, wherein:
each deformable element comprises an assembly including parts made of a shape-memory alloy and dimensioned to cause each deformable element to reach the expanded position as a result of the deformation of the parts by heat from the heat source.

14. A system as claimed in claim 2, wherein:
each deformable element is entirely made of a shape-memory material having ends secured to the tubular sleeve.

15. A system as claimed in claim 14, wherein:
each deformable element comprises an assembly including parts made of a shape-memory alloy and dimensioned to cause each deformable element to reach the expanded position as a result of the deformation of the parts by heat from the heat source.

16. A system as claimed in claim 2, wherein:
each deformable element comprises an assembly including parts made of a shape-memory alloy and dimensioned to cause each deformable element to reach the expanded position as a result of deformation of the parts by heat from the heat source.

17. A system as claimed in claim 2, wherein:
the heat source comprises a pumping installation for circulating in the pipe a heated fluid causing deformation of each deformable element until reaching the expanded position thereof.

18. A system as claimed in claim 2, wherein:
the heat source comprises an electric resistance included in each deformable element and a power supply circuit connected to a source of current at the surface which provides electric current to the electric resistance.

19. A system as claimed in claim 2, wherein:
the heat source comprises a mobile heating device positioning outside the pipe adjacent each coupling device.

20. A system as claimed in claim 1, comprising:
a centering element which transversely positions the support element in the pipe, the centering element being dimensioned so that in an expanded position of each deformable element, each coupling device is mechanically decoupled from the support element.

21. A system as claimed in claim 20, wherein:
each deformable element comprises an assembly including parts made of a shape-memory alloy and dimensioned to cause each deformable element to reach the expanded position as a result of the deformation of the parts by heat from the heat source.

22. A system as claimed in claim 20, wherein:
the heat source comprises a pumping installation for circulating in the pipe a heated fluid causing deformation of each deformable element until reaching the expanded position thereof.

23. A system as claimed in claim 20, wherein:
the heat source comprises an electric resistance included in each deformable element and a power supply circuit connected to a source of current at the surface which provides electric current to the electric resistance.

24. A system as claimed in claim 20, wherein:
the heat source comprises a mobile heating device positionable outside the pipe adjacent each coupling device.

25. A system as claimed in claim 1, wherein:
each deformable element comprises an assembly including parts made of a shape-memory alloy and dimensioned to cause each deformable element to reach the expanded position as a result of deformation of the parts by heat from the heat source.

26. A system as claimed in claim 1, wherein:
each coupling device has at least one tubular element made of a shape-memory alloy, placed between stops secured to the support element, each tubular element being deformable from a set-back position where a cross-section thereof is smaller than the cross-section of the pipe to an expanded position where a cross-section thereof is at least equal to the cross-section of pipe which decouples each tubular element from the stops.

27. A system as claimed in claim 1, wherein:
each support element is a cable, at least one sonde being lowered in the pipe and suspended from the cable, each sonde having a body, an anchor arm movable away from the body by deformation of each deformable element made of a shape-memory alloy, and wherein the heat source provides heat to the shape-memory alloy to cause moving away of each anchor arm and coupling of the body against the wall of the pipe.

28. A system as claimed in claim 1, wherein:
the heat source comprises a pumping installation for circulating in the pipe a heated fluid causing deformation of each deformable element until reaching the expanded position thereof.

29. A system as claimed in claim 1, wherein:
the heat source comprises a mobile heating device positionable outside the pipe adjacent each coupling device.

30. A system as claimed in claim 1, wherein:
the elongated support tube comprises tubing in which fluids are drained.

31. A system used to install a series of spaced apart seismic sondes against a wall of a well drilled through an underground zone comprising:
a support element which is lowered into the well from a surface installation, coupling devices which couple the seismic sondes to the wall, each coupling device comprising at least one deformable element at least partly made of a shape-memory alloy to which one seismic sonde is fastened, each deformable element in response to a temperature variation moving from set-back position disposed at a distance from the wall of the pipe to an expanded position where each seismic sonde is pressed against the wall of the pipe and acoustically decoupled from the support element, a heat source providing heat to the shape-memory alloy to vary the temperature of the shape-memory element and a transmitter which transmits signals picked up by the seismic sondes to a surface recording station.

32. A system as claimed in claim 31, wherein:
the heat source comprises an electric resistance included in each deformable element and a power supply circuit connected to a source of current at the surface which provides electric current to the electric resistance.

33. A system as claimed in claim 31, wherein:
the support element is a cable supporting at least one sonde provided with an anchor arm at least partly made of the shape-memory alloy.

34. A system as claimed in claim 33, wherein:
the heat source comprises a surface pumping installation which circulates in a pipe a heated fluid to provide heat to each deformable element which causes deformation of each deformable element to reach the expanded position thereof.

35. A system as claimed in claim 34, wherein:
the support element is tubing which is part of development of the underground zone.

36. A system as claimed in claim 33, wherein:

the support element is tubing which is part of development of the underground zone.

37. A system of claim in claim 31, wherein:

the heat source comprises a surface pumping installation which circulated in a pipe a heated fluid to provide heat to each deformable element which causes deformation of each deformable element to reach the expanded position thereof.

38. A system as claimed in claim 37, wherein:

the support element is tubing which is part of development of the underground zone.

39. A system as claimed in claim 31, wherein:

the heat source comprises an electric resistance included in each deformable element and a power supply circuit connected to a source of current at the surface which provides electric current to the electric resistance.

40. A system as claimed in claim 39, wherein:

the support element is a tubing which is part of development of the underground zone.

41. A system as claimed in claim 31, wherein:

the heat source comprises an electric resistance included in each deformable element and a power supply circuit connected to a source of current at the surface which provides electric current to the electric resistance.

42. A system as claimed in claim 41, wherein:

the support element is a tubing which is part of development of the underground zone.

43. A system as claimed in claim 31, wherein:

the support element is tubing which is part of development of the underground zone.

44. A system as claimed in claim 31, wherein:

the support element is tubing which is taken up to the surface after installation of the seismic sondes.

* * * * *